United States Patent
Leitner

(10) Patent No.: US 10,012,816 B2
(45) Date of Patent: Jul. 3, 2018

(54) BINOCULAR TELESCOPE

(71) Applicant: Swarovski-Optik KG., Absam (AT)

(72) Inventor: Matthias Leitner, Gnadenwald (AT)

(73) Assignee: Swarovski-Optik KG (AT)

(*) Notice: Subject to any disclaimer, the term of this patent is extended or adjusted under 35 U.S.C. 154(b) by 0 days.

(21) Appl. No.: 15/204,333

(22) Filed: Jul. 7, 2016

(65) Prior Publication Data
US 2017/0010436 A1    Jan. 12, 2017

(30) Foreign Application Priority Data
Jul. 9, 2015 (AT) .............................. A 50603/2015

(51) Int. Cl.
| G02B 7/04 | (2006.01) |
| G02B 7/06 | (2006.01) |
| G02B 7/02 | (2006.01) |
| G02B 23/18 | (2006.01) |

(52) U.S. Cl.
CPC ............... *G02B 7/06* (2013.01); *G02B 7/02* (2013.01); *G02B 7/04* (2013.01); *G02B 23/18* (2013.01)

(58) Field of Classification Search
CPC ... G02B 7/06; G02B 7/04; G02B 7/02; G02B 23/18
USPC .................................................. 359/407, 410
See application file for complete search history.

(56) References Cited

U.S. PATENT DOCUMENTS

| 4,346,960 | A | * | 8/1982 | Lehrmund | G02B 23/06 359/408 |
| 4,989,963 | A | * | 2/1991 | Farnung | G02B 7/06 359/414 |
| 5,103,248 | A | * | 4/1992 | Sato | G02B 7/06 359/414 |
| 5,191,471 | A | | 3/1993 | Funathu | |
| 5,212,592 | A | * | 5/1993 | Kato | G02B 7/06 359/410 |
| 5,231,535 | A | * | 7/1993 | Peters | G02B 23/18 359/414 |
| 5,969,858 | A | * | 10/1999 | Funatsu | G02B 7/06 359/407 |
| 6,008,937 | A | * | 12/1999 | Yano | G02B 23/18 359/407 |
| 6,266,185 | B1 | | 7/2001 | Miller et al. | |
| 2003/0025993 | A1 | * | 2/2003 | Crista | G02B 7/12 359/426 |

(Continued)

FOREIGN PATENT DOCUMENTS

| DE | 4122349 A1 | 1/1992 |
| EP | 0961147 A1 | 12/1999 |

(Continued)

*Primary Examiner* — William R Alexander
(74) *Attorney, Agent, or Firm* — Lerner, David, Littenberg, Krumholz & Mentlik, LLP

(57) ABSTRACT

The invention relates to a binocular telescope with two lens barrels, which for focusing comprise axially displaceable focusing means, and with a joint focusing device, wherein the focusing device comprises a housing and a rotary knob and the rotary knob is axially displaceable on the housing, wherein the rotary knob is rotatably coupled in a focusing position to a focusing gear and is rotatably coupled in a diopter balancing position to a diopter gear, wherein the rotary knob comprises a locking mechanism for fixing the rotary knob in the focusing position.

21 Claims, 6 Drawing Sheets

(56) References Cited

U.S. PATENT DOCUMENTS

| | | | | |
|---|---|---|---|---|
| 2004/0233522 A1* | 11/2004 | Hengst | ............... | G02B 7/10 |
| | | | | 359/410 |
| 2005/0259321 A1* | 11/2005 | Hengst | ............... | G02B 23/18 |
| | | | | 359/414 |
| 2009/0273832 A1* | 11/2009 | Yamamoto | ............... | G02B 7/04 |
| | | | | 359/418 |
| 2010/0188744 A1* | 7/2010 | Hengst | ............... | G02B 23/18 |
| | | | | 359/413 |
| 2015/0015944 A1* | 1/2015 | Schmitt | ............... | G02B 7/06 |
| | | | | 359/408 |

FOREIGN PATENT DOCUMENTS

| | | | |
|---|---|---|---|
| EP | 2083305 A1 | 7/2009 | |
| GB | 765272 A | 1/1957 | |

\* cited by examiner

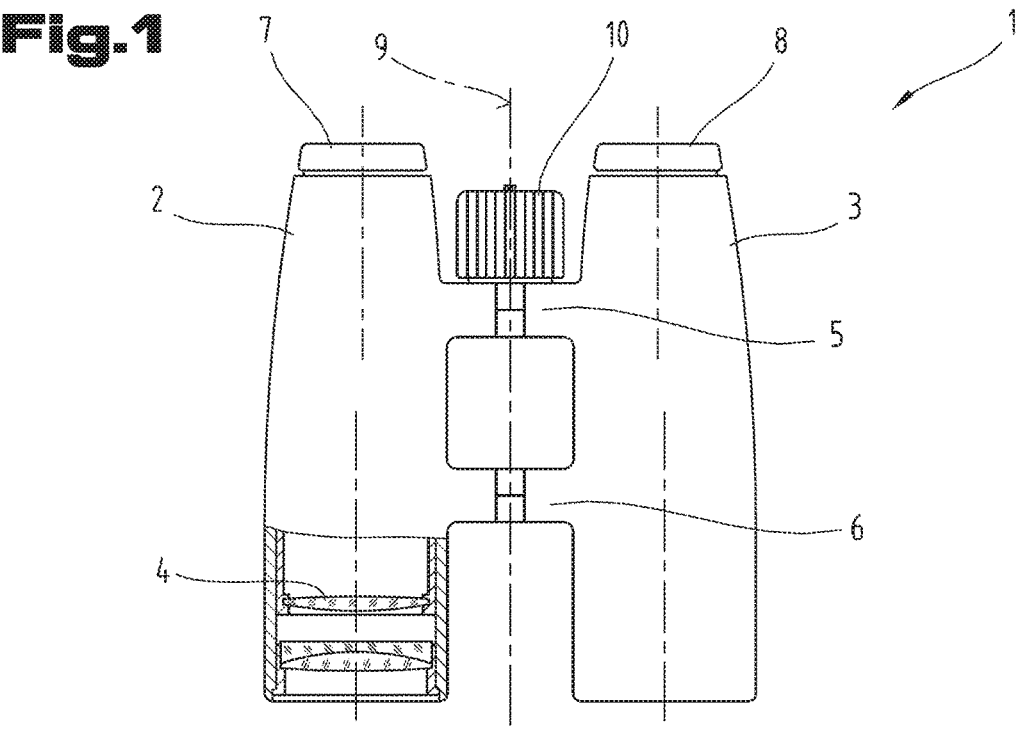
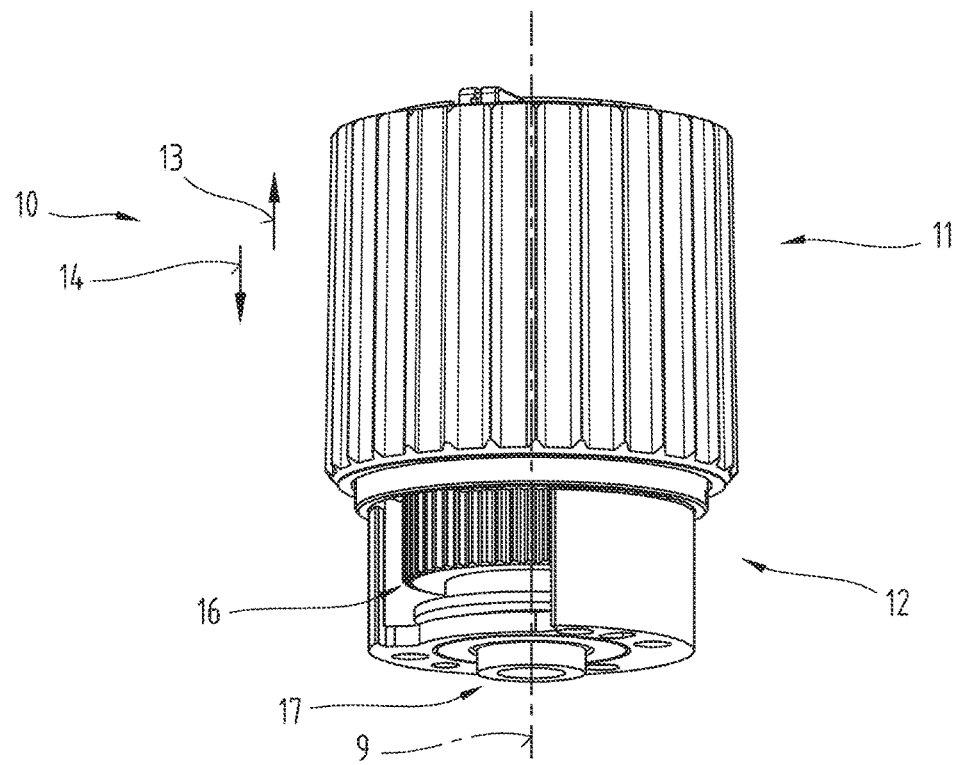

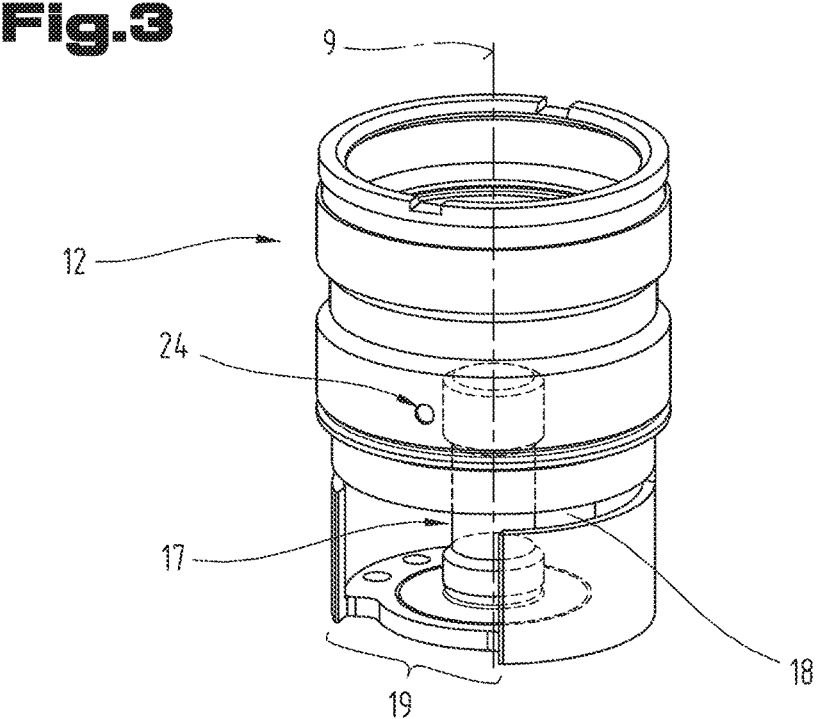
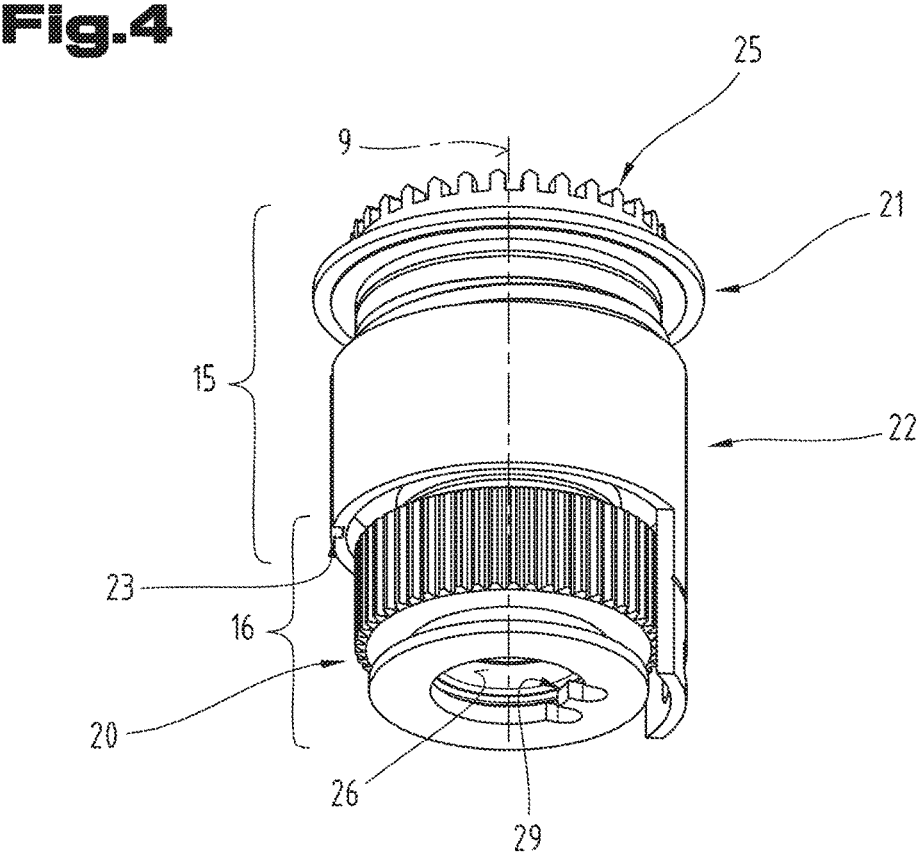

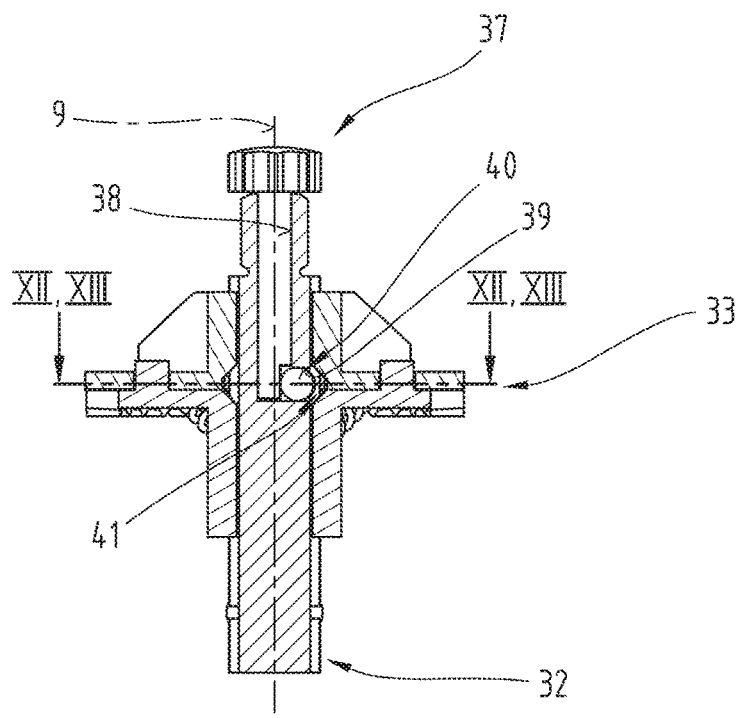
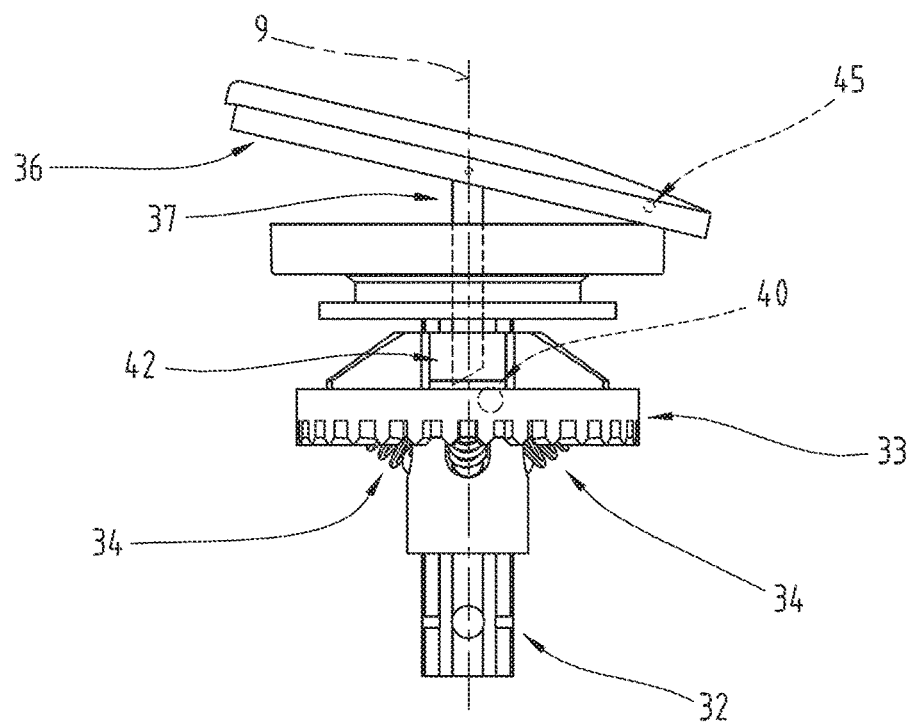

BINOCULAR TELESCOPE

BACKGROUND OF THE INVENTION

The invention relates to a binocular telescope with two lens barrels, which for focusing comprise axially displaceable focusing means and with a joint focusing device according to the preamble of claim 1.

Binocular telescopes or field glasses comprise in addition to means for adjusting the focus a diopter setting for balancing eyesight differences between the left and right eye. This is usually achieved by means of an additional adjustment of an eyepiece. Separately from this a so-called central focus is used to jointly focus both optical systems or lens barrels. In modern embodiments the focusing function as well as the diopter balancing function are integrated into a common central focusing device. A common rotary knob can be adjusted back and forth by axial displacement between a focusing position and a diopter balancing position. The adjustment on the rotary knob is transmitted via a gear provided in the elastic joint parts to the focusing means of the binocular telescope. The focusing means can either be formed by the eyepiece lenses themselves, which can be displaced relative to the latter in axial direction, or the binocular telescope comprises a so-called internal focusing, in which a lens mounted inside the lens barrel is displaced axially by means of a gear.

BRIEF SUMMARY OF THE INVENTION

It is now desirable for a user of a binocular telescope that once a diopter adjustment has been made it should not be adjusted further. In known focusing devices, which have both a focusing position and a diopter balancing position, it can be disadvantageous if the rotary knob is displaced unintentionally into the diopter balancing positing during handling or wearing. In this way the viewing channel can be altered further and the setting of the eyesight difference is lost.

It is therefore the objective of the invention to create a binocular telescope with a focusing device in which an already set adjustment of the diopter balance can be maintained with a greater degree of reliability.

Said objective of the invention is achieved by a binocular telescope with two lens barrels, which for focusing have axially displaceable focusing means, and with a common focusing device, wherein the focusing device comprises a housing and a rotary knob. The rotary knob is axially displaceable on the housing, wherein the rotary knob is coupled rotatably in a focusing position to a focusing gear and in a diopter balancing position is coupled rotatably to a diopter gear, wherein the rotary knob comprises a locking mechanism for securing the rotary knob in the focusing position.

It is also advantageous to design the telescope so that the rotary knob comprises a spline shaft for transmitting a rotary movement to the diopter gear.

According to an advantageous development of the telescope the locking mechanism comprises an adjusting bolt with a bar and a holding element which can be fixed by the bar, wherein the adjusting bolt is mounted in a hole in the spline shaft running coaxially to the rotary knob and the spline shaft is designed in the region of the bar of the adjusting bolt with a radial bearing hole for receiving the holding element. In this way it is possible to restrict the range of the axial displacement of the rotary knob on the housing of the focusing device.

Advantageously the bar is formed on a lower end of the adjusting bolt.

According to an advantageous development of the telescope, the locking mechanism comprises an operating element mounted in a cover section of the rotary knob, wherein the operating element is connected to an upper end of the adjusting bolt. It is also the case that the operating element of the locking mechanism is designed as a rotary knob cover, wherein the rotary knob cover is mounted rotatably in the cover section of the rotary knob relative to a longitudinal central axis of the rotary knob. It is an advantage here that the outer form of the rotary knob of the focusing device remains essentially unchanged, regardless of whether the locking mechanism is in the activated or deactivated position.

A design of the telescope is also advantageous in which the focusing gear comprises a focusing sleeve mounted axially displaceably in the housing and a thread coupling mounted rotatably in the housing. It is also the case that the diopter gear comprises a diopter sleeve mounted rotatably on an axial section of the focusing sleeve and a drive bush running coaxially inside the axial section of the focusing sleeve. Said designs have the advantage of having a particularly compact design for the inner structure of the focusing device, wherein essentially sleeve-like components which are rotatable relative to one another or are axially displaceable form different gear parts.

The development of the telescope is also advantageous in which the drive bush is mounted rotatably on an axial section of the housing.

According to one development of the telescope the rotary knob comprises a shifting hub, wherein the shifting hub can be adjusted on the spline shaft in axial direction and is coupled rotatably to the spline shaft. It is also the case that the shifting hub can be moved by axial displacement on the spline shaft into engagement with the drive bush. Lastly, between the shifting hub and the spline shaft at least one spring-loaded tilted spring is provided with two stable positions, wherein the shifting hub is in engagement with the drive bush in one of the stable positions. Said embodiments have the advantage of providing a compact, space-saving structure of the diopter gear.

According to an advantageous development of the telescope the adjusting bolt is mounted pivotably in the spline shaft in the hole coaxial to the rotary knob and also the bar is formed by an eccentrically designed section of the adjusting bolt. It is lastly the case that the shifting hub has a depression on an inner wall opposite the bearing hole for partly receiving the holding element, wherein in one position the holding element is fixed by the bar in a form-fitting manner in the depression of the shifting hub and the bearing hole of the spline shaft. This has the advantage that the locking effect is only determined by the position of the holding element in the fixed position. A restoring force acting back on the operating element of the locking mechanism and thus removing the locking is not available.

According to an alternative embodiment of the telescope or the focusing device the adjusting bolt is mounted axially displaceably in the spline shaft in the hole running coaxially to the rotary knob. It is also the case that the bar is formed by a wedge-shaped section of the adjusting bolt. Lastly, the adjusting bolt is connected by articulation to the rotary knob cover, wherein the rotary knob cover is mounted so that it can be flipped in the cover section relative to an axis running perpendicularly to the longitudinal central axis of the rotary knob. It is an advantage that for a user the inactive position of the lock can be recognized more easily.

According to a further, alternative embodiment of the telescope or the focusing device the axial section of the housing, on which the drive bush is mounted, has a peripheral groove on an inner wall opposite the bearing hole for partly receiving the holding element, wherein in one position of the bar the holding element is fixed by the bar in a form-fitting manner in the groove or in the depression of the axial section of the housing and the bearing hole of the spline shaft. This has the advantage that in this way the locking is effective directly between the locking mechanism in the rotary knob and a part of the housing.

A development is also advantageous in which the holding element is formed by a ball. With relative movements of adjacent parts of the mechanism relative to the ball or the bearing hole in the spline shaft the ball form allows a rolling movement and thus a reduction in the friction.

BRIEF DESCRIPTION OF THE DRAWINGS

For a better understanding of the invention the latter is explained in more detail with reference to the following Figures.

In the latter in a much simplified, schematic representation:

FIG. 1 shows a binocular telescope with a focusing device;

FIG. 2 shows a focusing device in perspective;

FIG. 3 shows the housing of the focusing device according to FIG. 2;

FIG. 4 shows the focusing gear with the diopter sleeve of the diopter gear of the focusing device according to FIG. 2 mounted thereon;

FIG. 9 shows a cross-section of the spline shaft and shifting hub;

FIG. 10 shows an alternative example embodiment of the locking mechanism of the focusing device according to FIG. 1;

DETAILED DESCRIPTION

Figure 5:
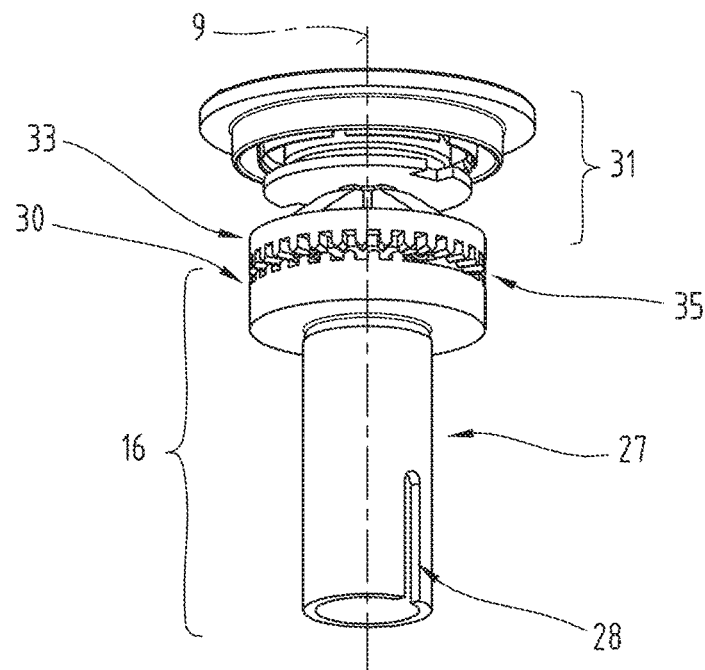
FIG. 5 shows the upper rotary knob part according to FIG. 2 together with the drive bush of the diopter sleeve.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

The binocular telescope 1 shown in FIG. 1 has a so-called internal focusing, wherein in both lens barrels 2, 3 an axially displaceable lens 4 is provided respectively as focusing means. In the shown example embodiment of the binocular telescope 1 the two lens barrels 2, 3 are connected pivotably by elastic joints 5, 6, so that it is possible adjust the two eyepieces 7, 8 to the distance between the eyes of a user. A focusing device 10 is arranged coaxial to the longitudinal central axis 9 of the elastic joints 5, 6 on the elastic joint 5 facing the eyepieces 7, 8. By means of the focusing device 10 in the telescope 1 both a diopter balancing and also an adjustment of the focus to a remote object can be performed. For this the focusing device 10 is connected mechanically with the interconnection of a gear, not described in more detail, to the axially displaceable focusing means 4 in the two lens barrels 2, 3.

FIG. 2 shows the focusing device 10 according to the invention in perspective view. Depending on whether the rotary knob 11 of the focusing device 10 is located in its focusing position or its diopter balancing position, by means of a rotary movement of the rotary knob 11 the lenses 4 in both lens barrels 2, 3 are adjusted equally or the lens 4 is only adjusted in one of the two lens barrels 2, 3. The rotary knob 11 is mounted rotatably and also axially displaceably for this on a housing 12 of the focusing device 10 (FIG. 3). In the representation according to FIG. 2 the rotary knob 11 is located in its focusing position. By lifting in axial direction, according to arrow 13, the rotary knob 11 can be moved into the diopter balancing position of the focusing device 10. An axial displacement in the direction of arrow 14 moves the rotary knob 11 out of the diopter balancing position back into the focusing position of the focusing device 10.

The two said positions of the rotary knob 11, i.e. the focusing position on the one hand and the diopter balancing position on the other hand, are synonymous, in that in these positions the rotary knob 11 is coupled mechanically to a corresponding gear. This means that in the lower or pushed down position (arrow 14), of the focusing position the rotary knob 11 acts on a focusing gear 15 of the focusing device 10 (FIG. 4). On the other hand, the rotary knob 11 in its lifted position (arrow 13), the diopter balancing position, is coupled mechanically to a diopter gear 16 (FIG. 4, 5) and using the latter achieves an axial displacement of the focusing means or the lens in only one of the lens barrels 7, 8.

FIG. 3 shows the housing 12 of the focusing device 10 according to FIG. 2. The corresponding mechanical adjustments movements are made in relation to the fixed housing 12, which is fixed in turn to the elastic joint 5 (FIG. 1). The outer form of the housing 12 of the focusing device 10 is designed to be essentially circular cylindrical or pot-like (FIG. 3). On the base area of the housing 12 the latter has on the inside an axial section 17 designed to be coaxial to the longitudinal central axis 9. Whilst the rotary knob 11 surrounds the upper section of the housing 12 in the manner of a cap (FIG. 2), the focusing gear 15 and the diopter gear 16 are mounted on the inside of the housing 12. For connecting further gear parts to the lenses 4 of the lens barrels 2, 3 in the lower section of the housing 12 a first window 18 and a second window 19 are provided.

FIG. 4 shows the focusing gear 15 with a diopter sleeve 20 mounted thereon which forms part of the diopter gear 16. The focusing gear 15 comprises a thread coupling 21 and a focusing sleeve 22. The thread coupling 21 is mounted rotatably relative to the longitudinal central axis 9 in the housing 12, whereas the focusing sleeve 22 can only be displaced in axial direction. For this purpose the focusing sleeve 22 comprises a groove 23 running in axial direction into which a bolt 24 protruding inwardly from the inside of the housing 12 engages (FIG. 3). A rotary movement of the thread coupling 21 is converted in this way to an axial displacement of the focusing sleeve 22, by means of which the lenses 4 of the lens barrels 2, 3 are then adjusted in axial direction. The required rotary movement of the thread coupling 21 is achieved by mechanical coupling of a toothing 25 provided on the latter to the rotary knob 11. The toothing 25 of the thread coupling 21 is designed in the form of a crown gear and engages in a corresponding toothing, which is provided in the rotary knob 11 (not shown). This is achieved in that the rotary knob 11 is moved into the focusing position according to arrow 14.

The diopter sleeve 20 of the diopter gear 16 is mounted in turn on a sleeve-like axial section 26 of the focusing sleeve 22 and is also moved together with the focusing sleeve 22 in axial direction. By connecting the axial movement of the lens 4 of one of the lens barrels 2, 3 directly to the focusing sleeve 22 and the lens 4 of the other of the two lens barrels 2, 3 to the diopter sleeve 20 the lenses 4 in both lens barrels 2, 3 can be adjusted to the same degree. For the lens 4 coupled mechanically to the diopter sleeve 20 also a movement superimposed on the movement of the focusing sleeve 22 is available, by which a diopter balance can be achieved between the two lens barrels 2, 3.

The diopter sleeve 20 is designed as a gear wheel on its circumference. To produce a rotary movement of the diopter sleeve 20 the diopter gear 16 comprises a drive bush 27 (FIG. 5). For this it is mounted rotatably on the axial section 17 of the housing 12 (FIG. 3), wherein it is secured onto the axial section 17 of the housing 12 such that it is fixed in axial direction. For transmitting the rotary movement between the drive bush 27 and the diopter sleeve 20, which due to its support on the focusing sleeve 22 can also be moved axially, there is a coupling of rotary movements between the latter, which enables axial adjustment. According to this example embodiment the coupling is formed by a slit 28 running axially in the drive bush 27 (FIG. 5) and a pin 29 of the diopter sleeve 20 engaging in said slit 28 (FIG. 4). The drive bush 27 also comprises at its upper end section a toothing 30 in the form of a crown toothing.

Whereas the drive bush 27 with its tubular or cylindrical section is mounted rotatably on the axial section 17 of the housing 12 (FIG. 3), the outer cylinder casing of the drive bush 27 also forms an axis for the inside of the axial section 26 of the focusing sleeve 22 (FIG. 4).

Figure 6:
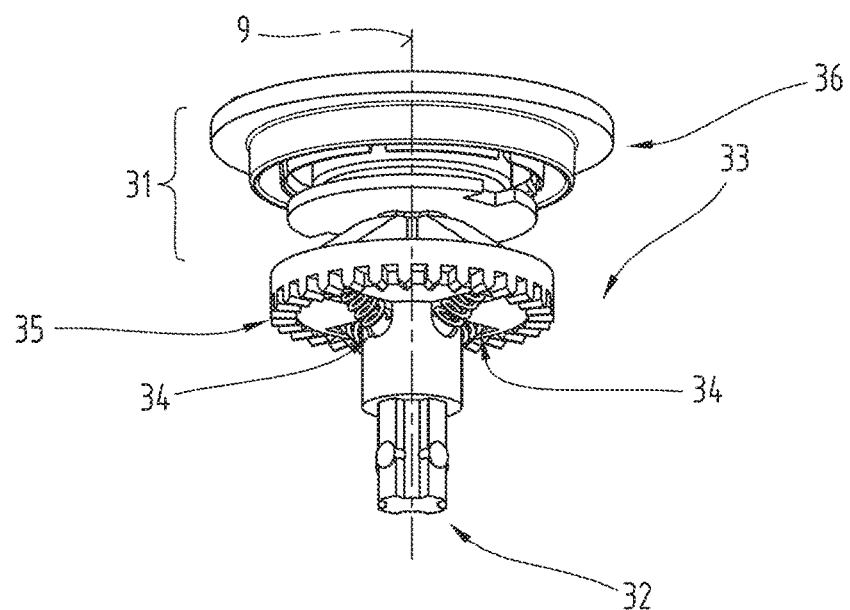
FIG. 6 shows the upper rotary knob part with spline shaft and shifting hub.

It order to set the diopter it is necessary to form a mechanical coupling of the rotary knob 11 to the drive bush 27 of the diopter gear 16. This is achieved by coupling to the toothing 30 of the drive bush 27. For this the rotary knob 11 (FIG. 2) comprises a cover section 31 with a drive shaft or spline shaft 32 fixed protruding from the cover section 31 downwards or inwards. Said components of the rotary knob 11 are shown together separately for a better overview in FIG. 6. On the spline shaft 32 also a shifting hub 33 is arranged, coupled to the spline shaft 32 rotatably, wherein the shifting hub 33 can be displaced on the spline shaft 32 in axial direction. The connection or cross-section of the connecting point between the spline shaft 32 and the shifting hub 33 has a cross-like profile, so that a rotary movement can be transmitted from the spline shaft 32 to the shifting hub 33. The displacement of the shifting hub 33 on the spline shaft 32 is supported by the formation of tilted springs 34 acting between the shifting hub 33 and the spline shaft 32. Compression loaded springs of said tilted springe 34 hold the shifting hub 32 relative to the spline shaft 32 either in an upper or in a lower position or point. The shifting hub 33 also has on its outer circumference a downwards pointing toothing 35 in the manner of a crown gear.

The turning of the shifting hub 33 opposite the spring force of the tilted springs 34 occurs automatically, as the axial range of movement of the shifting hub 33 on the inside of the focusing device is limited. With an upwards movement of the rotary knob 11 (arrow 13) an upper edge of the shifting hub 33 bears on an inner circumference of the thread coupling 21 and is prevented by the latter from further upwards movement (not shown). Lastly, the component of the force of the springs of the tilted springs 34 acting in vertical direction changes so that the shifting hub 33 is pushed by the latter into its lower position. In opposite direction the drive bush 27 or its toothing 30 acts as an obstacle to the shifting hub 33 and the tilted springs 34 lastly move the shifting hub 33 into its upper position, when the rotary knob 11 is pushed back into its focusing position The toothing 35 of the shifting hub 33 and the toothing 30 of the drive bush 27 can be moved into or out of engagement depending on the position of the rotary knob 11 on the housing 12 (FIG. 5). If the rotary knob 11 is lifted according to arrow 13 and moved into the diopter balancing position (FIG. 2) at the same time the shifting hub 33 on the spline shaft 32 is pushed downwards. Lastly, this means that the toothing 35 of the shifting hub 33 engages in the toothing 30 of the drive bush 27 and thus enables the transfer of a rotary movement from the rotary knob 11 to the diopter sleeve 20. With the upwards movement of the rotary knob 11 according to arrow 13 (FIG. 2) at the same time the mechanical coupling with the toothing 25 of the thread coupling 21 (FIG. 4) is disconnected.

By adjusting the rotary knob 11 in reverse direction, according to arrow 14 (FIG. 2) the latter is moved in turn into its focusing position, in which the coupling to the focusing sleeve 22 is reproduced by the toothing 25 of the thread coupling 21. At the same time the shifting hub 33 on the spline shaft 32 is pushed back upwards (FIG. 6) and in this way the coupling to the toothing 30 of the drive bush 27 is disconnected again.

Figure 7:
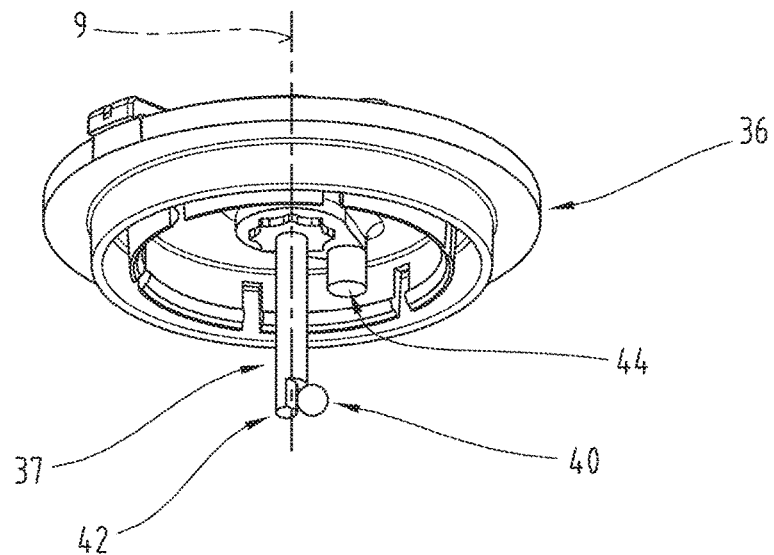
FIG. 7 shows the locking mechanism of the rotary knob according to FIG. 6.

The focusing device according to the invention is lastly designed with a lock for securing the rotary knob 11 in its focusing position. It can be ensured with this lock that there is no unintentional adjustment of a diopter setting made by a user. This would be possible if on handling the telescope 1 the rotary knob 11 were to be lifted unnoticed into the diopter balancing position (arrow 13). For locking the focusing device in the upper rotary knob part shown in FIG. 6 a locking mechanism is formed. Said locking mechanism comprises a rotary knob cover 36 arranged in the cover section 31 of the rotary knob 11 and an adjusting bolt 37 fixed onto the latter coaxially to the longitudinal central axis 9 (FIG. 7, 8). For this the spline shaft 32 comprises a coaxially or centrally arranged and axially running hole 38, in which the adjusting bolt 37 is mounted (FIG. 9).

Figure 12:
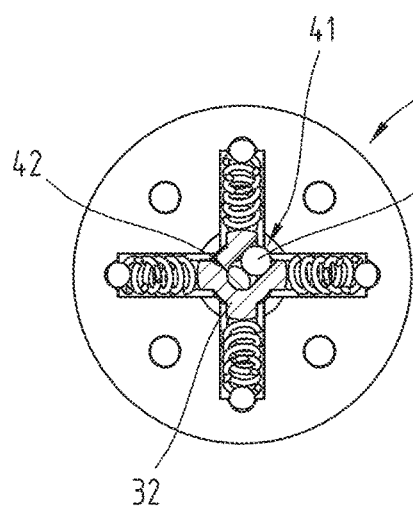
FIG. 12 shows a cross-section of the spline shaft with the shifting hub and the holding element in the non-arrested position according to FIG. 9.
Figure 13:
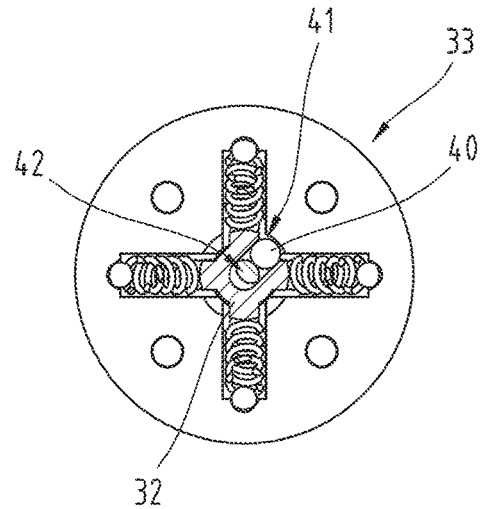
FIG. 13 shows a cross-section according to FIG. 9, wherein the spline shaft, the shifting hub and the holding element are shown in the arrested position.

According to a first example embodiment of the locking mechanism the adjusting bolt 37 and the rotary knob cover 36 connected rotationally securely to the latter can be pivoted in the spline shaft 32 about the longitudinal central axis 9. Furthermore, in the spline shaft 32 a radially running bearing hole 39 is provided in which a holding element 40 is mounted to be displaceable in radial direction. According to this example embodiment the holding element 40 is formed by a ball (FIG. 7, 9). The holding element 40 could however also have a different suitable form, for example it could have the form of a bolt rounded at both ends. On an inner wall of the shifting hub 33 lastly a depression 41 is formed. The adjusting bolt 37 also has a bar 42 at a lower end. The bar 42 is profiled eccentrically in cross-section in the region of the bearing hole 39 in the spline shaft 32. By pivoting the adjusting bolt 37 with the rotary knob cover 36 by about 180° the holding element 40 is displaced outwards from the bar 42 in the bearing hole 39 of the spline shaft 32 and fixed in a form-fitting manner in the depression 41 of the shifting hub 33 (FIG. 12, 13). The holding element 40 finally adopts a position between the shifting hub 33 and the spline shaft 32, in which its cross-section projects at least partly into both the depression 41 of the shifting hub and into the bearing hole 39 of the spline shaft. The holding element 40 fixed in this way by the bar 42 of the adjusting bolt 37 prevents the axial displacement of the shifting hub 33 on the spline shaft 32 (FIG. 13). The arrangement of the bearing hole 39 in the spline shaft 32 and the arrangement of the depression 41 on the inside of the shifting hub 33 are selected and aligned relative to one another so that the locking of the position corresponding to the focusing position corresponds to the shifting hub 33.

FIGS. 12 and 13 shows respectively a cross-section of the spline shaft 32 with the shifting hub 33 and the holding element 40 according to FIG. 9, wherein the holding element 40 formed by a ball is shown in FIG. 12 in the non-locked position and in FIG. 13 in the locked position.

For activating or deactivating the locking mechanism the rotary knob cover 36 is provided as an operating element. The latter can be connected securely to the adjusting bolt 37 according to this example embodiment, as already explained above, pivoted by about 180°. In order to perform the locking reliably the pivot range of the rotary knob cover 36 or the adjusting bolt 37 is delimited by a stop element 43 provided in the cover section 31. Furthermore, the rotary knob cover 36 is designed to have an eccentrically arranged stop bolt 44, the annular movement range of which is delimited by the stop element 43 on both sides (FIG. 7, 8).

FIG. 10 shows an alternative example embodiment of the locking mechanism of the focusing device 10. The adjusting bolt 37 is designed to be displaceable in axial direction, that is parallel to the longitudinal central axis 9. The bar 42 of the adjusting bolt 37 has the form of a wedge with a cross-section that widens from the bottom to the top. The rotary knob cover 36 and the adjusting bolt 37 are connected to one another by articulation, wherein the rotary knob cover 36 in the cover section 31 can be mounted to be able to be flipped up relative to an axis 45 running perpendicular to the longitudinal central axis 9. If the rotary knob 11 of the focusing device 10 has to be moved into the diopter balancing position, firstly the locking has to be deactivated, in that the rotary knob cover 36 is lifted on one side and positioned obliquely. At the same time the adjusting bolt 37 connected by articulation to the rotary knob cover 36 is pulled upwards in the hole 38 of the spline shaft 32 and the holding element 40 is released from the bar 42. The shifting hub 33 is thereby displaceable on the spline shaft 32 and lastly it is also possible that the rotary knob 11 is lifted upwards, according to arrow 13 into the diopter balancing position. The rotary knob cover 36 remains in the obliquely raised position even during the setting of the diopter, as shown in FIG. 10. Once the user has completed the diopter setting, the rotary knob 11 is pushed back down, according to arrow 14 and then the locking can be reactivated, in that the rotary knob cover 36 is flipped downwards. In this way the bar 42 of the adjusting bolt 37 is displaced so far downwards that the holding element 40 is clamped between the shifting hub 33 and the spline shaft 32. The locking is then active again.

Figure 8:
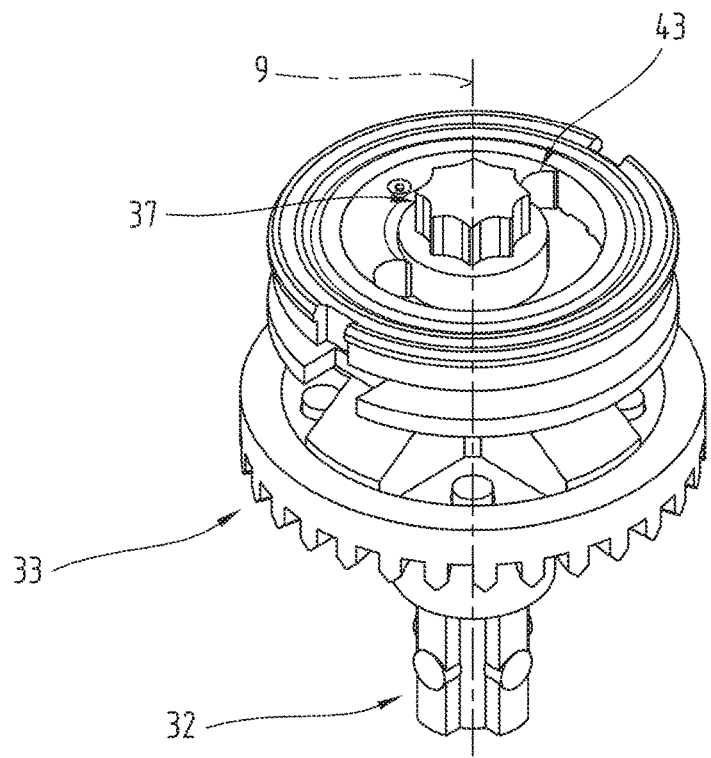
FIG. 8 shows the upper rotary knob part with the adjusting bolt of the locking mechanism.
Figure 11:
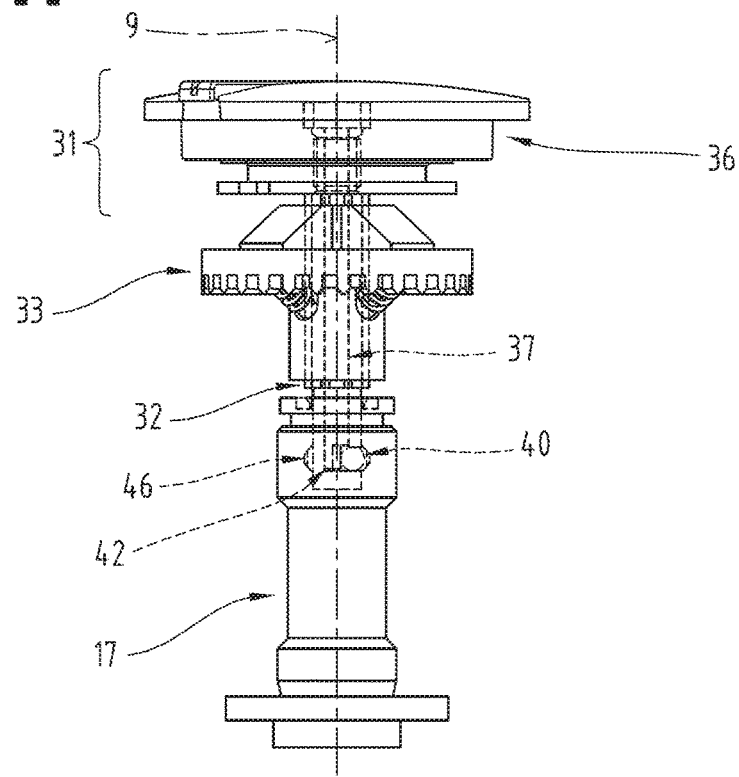
FIG. 11 shows a further alternative example embodiment of the locking mechanism of the focusing device.

FIG. 11 shows a further, alternative example embodiment of the locking mechanism of the focusing device 10. In this case the rotary knob cover 36 and the adjusting bolt 37 are also designed to be pivotable, as described with reference to FIGS. 7 to 9. According to this example embodiment the adjusting bolt 37 now extends into the axial section 17 of the housing 12 (FIG. 3). The bar 42 of the adjusting bolt 37 and also the bearing hole 39 of the spline shaft 32 are also arranged in the region of the axial section 17 of the housing 12. On an inner side of the axial section 17 the latter has an annularly running groove 46 for receiving the holding element 40. In the region of the groove 46 of the axial section 17 both the inside of the axial section 17 and the spline shaft 32 are formed by cylinder casing surfaces bearing on one another.

According to a further, alternative example embodiment of the locking mechanism the adjusting bolt 37 is designed to be axially displaceable (according to the description of FIG. 10) and there is engagement between the holding element 40 and the axial section 17 of the housing 12 (as described according to FIG. 11).

The exemplary embodiments show possible embodiment variants of the telescope 1, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

Furthermore, individual features or combinations of features of the different shown and described example embodiments can in themselves also represent independent solutions according to the invention.

The problem addressed by the independent solutions according to the invention can be taken from the description.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

Mainly the individual embodiments shown in FIGS. 1, 2, 3, 4, 5, 6, 7, 8, 9; 10; 11; 12 and 13 can form the subject matter of independent solutions according to the invention. The objectives and solutions according to the invention relating thereto can be taken from the detailed descriptions of these figures.

Finally, as a point of formality, it should be noted that for a better understanding of the structure of the telescope the latter and its components have not been represented true to scale in part and/or have been enlarged and/or reduced in size.

The invention claimed is:
1. A binocular telescope with two lens barrels,
   which for focusing comprise axially displaceable focusing means,
   and with a joint focusing device, wherein the focusing device comprises a housing and a rotary knob
   and said rotary knob is axially displaceable on the housing,
   wherein said rotary knob is rotatably coupled in a focusing position to a focusing gear
   and said rotary knob is rotatably coupled in a diopter balancing position to a diopter gear, wherein said rotary knob comprises a locking mechanism for fixing said rotary knob in the focusing position by locking said rotary knob against a further axial displacement, wherein the locking mechanism comprises an operating element capable of activating and deactivating the locking mechanism.

2. The telescope of claim 1, wherein said rotary knob comprises a spline shaft for transmitting a rotary movement to the diopter gear.

3. The telescope of claim 2, wherein the locking mechanism comprises an adjusting bolt with a bar and a holding element which can be fixed by the bar, wherein the adjusting bolt is mounted in a hole in the spline shaft running coaxially to said rotary knob and the spline shaft is designed in the region of the bar of the adjusting bolt with a radially running bearing hole for receiving the holding element.

4. The telescope of claim 3, wherein the bar is formed at a lower end of the adjusting bolt.

5. The telescope of claim 3, wherein the operating element is mounted in a cover section of said rotary knob, wherein the operating element is connected to an upper end of the adjusting bolt.

6. The telescope of claim 5, wherein the operating element of the locking mechanism is designed as a rotary knob cover, wherein the rotary knob cover is mounted rotatably in the cover section of said rotary knob relative to a longitudinal central axis of said rotary knob.

7. The telescope of claim 1, wherein the focusing gear comprises a focusing sleeve mounted axially displaceably in the housing and a thread coupling mounted rotatably in the housing.

8. The telescope of claim 7, wherein the diopter gear comprises a diopter sleeve mounted rotatably on an axial section of the focusing sleeve and a drive bush running coaxially inside the axial section of the focusing sleeve.

9. The telescope of claim 8, wherein the drive bush is mounted rotatably on an axial section of the housing.

10. The telescope of claim 8, wherein said rotary knob comprises a shifting hub, wherein the shifting hub can be adjusted on the spline shaft in axial direction and coupled rotatably to the spline shaft.

11. The telescope of claim 10, wherein the shifting hub can be moved into engagement with the drive bush by axial adjustment on the spline shaft.

12. The telescope of claim 10, wherein at least one spring-loaded tilted spring with two stable positions is formed between the shifting hub and spline shaft, wherein the shifting hub is in engagement with the drive bush in one of the stable positions.

13. The telescope of claim 3, wherein the adjusting bolt is pivotably mounted in the spline shaft in the hole running coaxially to said rotary knob.

14. The telescope of claim 3, wherein the bar is formed by an eccentrically designed section of the adjusting bolt.

15. The telescope of claim 3, wherein the shifting hub on an inner wall opposite the bearing hole comprises a depression for partly mounting the holding element, wherein in one position of the bar the holding element is fixed by the bar in a form-fitting manner in the depression of the shifting hub and the bearing hole of the spline shaft.

16. The telescope of claim 5, wherein in the cover section of said rotary knob a stop element is formed and on the rotary knob cover a stop bolt is formed, wherein by means of the stop element and the stop bolt the pivot range of the rotary knob cover is limited.

17. The telescope of claim 3, wherein the adjusting bolt is mounted to be axially displaceable in the spline shaft in the hole coaxial to said rotary knob.

18. The telescope of claim 17, wherein the bar is formed by a wedge-shaped section of the adjusting bolt.

19. The telescope of claim 17, wherein the adjusting bolt is connected by articulation to the rotary knob cover, wherein the rotary knob cover is mounted to be flipped up in the cover section relative to an axis running perpendicular to the longitudinal central axis of said rotary knob.

20. The telescope of claim 19, wherein the axial section of the housing, on which the drive bush is mounted, on an inner wall opposite the bearing hole comprises a circumferential groove for partly mounting the holding element, wherein in one position of the bar the holding element is fixed by the bar in a form-fitting manner in the depression of the axial section of the housing and the bearing hole of the spline shaft.

21. The telescope of claim 3, wherein the holding element is formed by a ball.

* * * * *